(12) United States Patent
Uskert

(10) Patent No.: US 9,310,079 B2
(45) Date of Patent: Apr. 12, 2016

(54) COMBUSTION LINER WITH OPEN CELL FOAM AND ACOUSTIC DAMPING LAYERS

(75) Inventor: Richard Christopher Uskert, Noblesville, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1017 days.

(21) Appl. No.: 13/162,103

(22) Filed: Jun. 16, 2011

(65) Prior Publication Data

US 2012/0167574 A1    Jul. 5, 2012

Related U.S. Application Data

(60) Provisional application No. 61/428,810, filed on Dec. 30, 2010.

(51) Int. Cl.
| | |
|---|---|
| *F23R 3/06* | (2006.01) |
| *F23R 3/00* | (2006.01) |
| *F23M 20/00* | (2014.01) |
| *F23M 5/02* | (2006.01) |

(52) U.S. Cl.
CPC .. *F23R 3/06* (2013.01); *F23M 5/02* (2013.01); *F23M 20/005* (2015.01); *F23R 3/002* (2013.01); *F23M 2900/05004* (2013.01); *F23R 3/007* (2013.01); *F23R 2900/00014* (2013.01); *F23R 2900/03041* (2013.01); *F23R 2900/03042* (2013.01); *Y02T 50/675* (2013.01)

(58) Field of Classification Search
CPC ..................... F23R 3/002; F23R 3/007; F23R 2900/03014; F23R 2900/03042; F23R 2900/03044; F23R 2900/03045; F23R 3/06; F23R 2900/00014; F23M 2900/05004; F23M 5/00; F23M 5/02; F23M 5/085; F23M 20/005; Y02T 50/675
USPC ................... 60/752, 753, 754, 760, 796, 725; 428/158, 304.4, 314.2, 311.11
See application file for complete search history.

(56) References Cited

U.S. PATENT DOCUMENTS

| | | | | |
|---|---|---|---|---|
| 4,254,171 A * | 3/1981 | Beggs et al. | ................... | 428/116 |
| 4,384,020 A * | 5/1983 | Beggs et al. | ................... | 428/138 |
| 4,642,993 A * | 2/1987 | Sweet | ............... | 60/752 |
| 4,832,999 A | 5/1989 | Sweet | | |
| 4,838,031 A * | 6/1989 | Cramer | ........................... | 60/753 |
| 4,990,391 A * | 2/1991 | Veta et al. | ..................... | 428/116 |

(Continued)

FOREIGN PATENT DOCUMENTS

| | | |
|---|---|---|
| EP | 2270397 A1 * | 1/2011 |
| GB | 1377648 A * | 12/1974 |

OTHER PUBLICATIONS

International Search Report and Written Opinion, PCT/US2011/067911, Rolls-Royce North American Technologies, Inc., Apr. 20, 2012.

*Primary Examiner* — Phutthiwat Wongwian
*Assistant Examiner* — Alain Chau
(74) *Attorney, Agent, or Firm* — Brinks Gilson & Lione

(57) ABSTRACT

The disclosure is directed to a gas turbine engine combustion liner and a gas turbine engine. The gas turbine engine combustion liner may include a thermally cooled wall section, an acoustically damped wall section, or a thermally cooled and acoustically damped wall section. Open cell foam or honeycomb may be disposed between inner and outer combustion liner walls. The walls, open cell foam, or honeycomb may be made of a composite material.

21 Claims, 4 Drawing Sheets

(56) References Cited

U.S. PATENT DOCUMENTS

| | | | |
|---|---|---|---|
| 5,184,455 A * | 2/1993 | Ewing et al. | 60/772 |
| 5,427,853 A * | 6/1995 | Powell et al. | 428/357 |
| 5,438,834 A * | 8/1995 | Vuillamy et al. | 60/753 |
| 5,605,046 A * | 2/1997 | Liang | 60/752 |
| 5,655,361 A * | 8/1997 | Kishi | 60/266 |
| 5,841,079 A * | 11/1998 | Parente | 181/214 |
| 6,122,892 A * | 9/2000 | Gonidec et al. | 52/793.1 |
| 6,257,366 B1 | 7/2001 | Gerretsen et al. | |
| 6,397,603 B1 * | 6/2002 | Edmondson et al. | 60/753 |
| 6,495,207 B1 * | 12/2002 | Prociw et al. | 427/245 |
| 6,670,026 B2 * | 12/2003 | Steibel et al. | 428/293.4 |
| 6,688,107 B2 | 2/2004 | Ono et al. | |
| 6,688,558 B2 | 2/2004 | Breer et al. | |
| 7,055,308 B2 | 6/2006 | Pinard et al. | |
| 7,311,790 B2 * | 12/2007 | Morrison | B28B 19/0053 156/153 |
| 2005/0045306 A1 * | 3/2005 | Petervary et al. | 165/80.3 |
| 2005/0076644 A1 * | 4/2005 | Hardwicke et al. | 60/772 |
| 2007/0096371 A1 * | 5/2007 | McGuigan et al. | 264/640 |
| 2007/0283700 A1 | 12/2007 | Gerendas et al. | |
| 2008/0145215 A1 | 6/2008 | Finn et al. | |
| 2009/0005232 A1 | 1/2009 | Hand et al. | |
| 2009/0260364 A1 * | 10/2009 | Keller et al. | 60/753 |
| 2010/0059311 A1 * | 3/2010 | Agrawal | F23M 20/005 181/256 |
| 2011/0167785 A1 * | 7/2011 | Moore et al. | 60/204 |
| 2012/0266603 A1 * | 10/2012 | Uskert et al. | 60/772 |

* cited by examiner

COMBUSTION LINER WITH OPEN CELL FOAM AND ACOUSTIC DAMPING LAYERS

CROSS REFERENCE TO RELATED APPLICATIONS

The present application claims benefit of U.S. Provisional Patent Application No. 61/428,810, filed Dec. 30, 2010, entitled GAS TURBINE ENGINE AND COMBUSTION LINER, which is incorporated herein by reference.

FIELD OF THE INVENTION

The present invention relates to gas turbine engines, and more particularly, to gas turbine engine combustion liners.

BACKGROUND

Gas turbine engine combustion liners that effectively withstand high temperature conditions and provide reduced acoustics remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine combustion liner. Another embodiment is a unique gas turbine engine. Other embodiments include apparatuses, systems, devices, hardware, methods, and combinations for gas turbine engines and gas turbine engine combustion liners. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
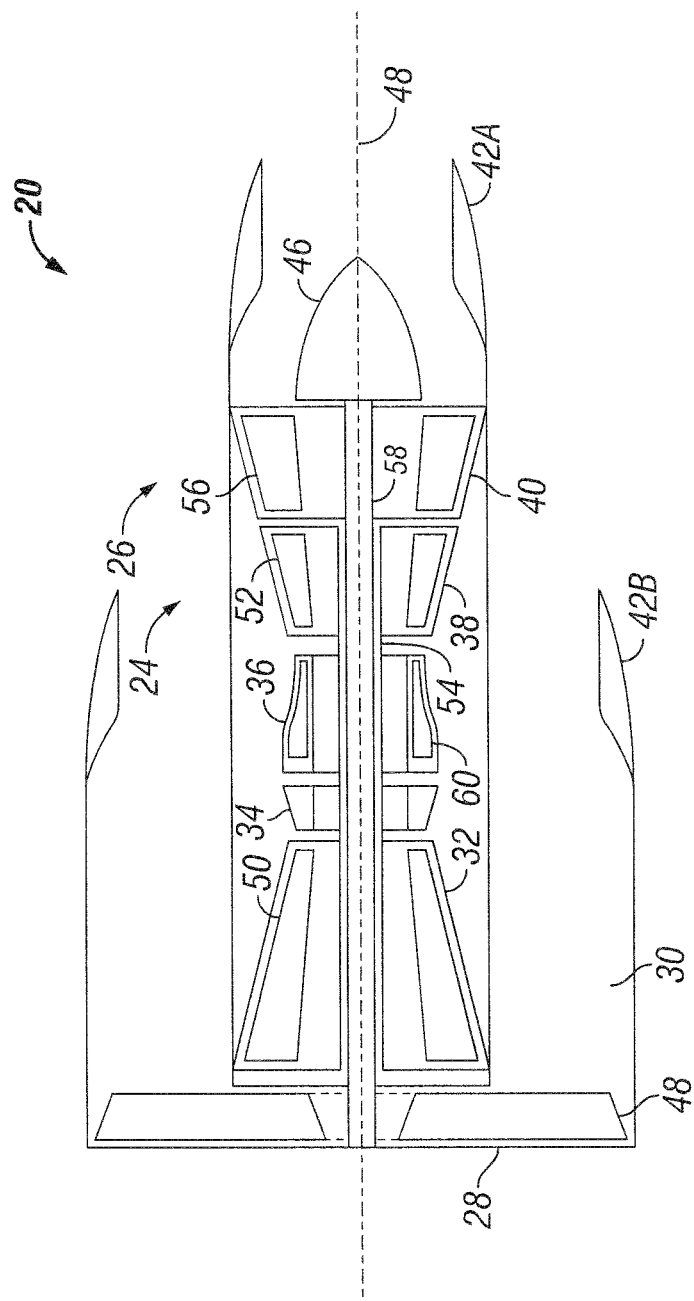
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, there are illustrated some aspects of a non-limiting example of a gas turbine engine 20 in accordance with an embodiment of the present invention. In one form, engine 20 is a propulsion engine, e.g., an aircraft propulsion engine. In other embodiments, engine 20 may be any other type of gas turbine engine, e.g., a marine gas turbine engine, an industrial gas turbine engine, or any aero, aero-derivative or non-aero derivative gas turbine engine. In one form, engine 20 is a two spool engine having a high pressure (HP) spool 24 and a low pressure (LP) spool 26. In other embodiments, engine 20 may include three or more spools, e.g., may include an intermediate pressure (IP) spool and/or other spools. In one form, engine 20 is a turbofan engine, wherein LP spool 26 is operative to drive a propulsor 28 in the form of a turbofan (fan) system, which may be referred to as a turbofan, a fan or a fan system. In other embodiments, engine 20 may be a turboprop engine, wherein LP spool 26 powers a propulsor 28 in the form of a propeller system (not shown), e.g., via a reduction gearbox (not shown). In yet other embodiments, LP spool 26 powers a propulsor 28 in the form of a propfan. In still other embodiments, propulsor 28 may take other forms, such as one or more helicopter rotors or tilt-wing aircraft rotors.

In one form, engine 20 includes, in addition to fan 28, a bypass duct 30, a compressor 32, a diffuser 34, a combustor 36, a high pressure (HP) turbine 38, a low pressure (LP) turbine 40, a nozzle 42A, a nozzle 42B, and a tailcone 46, which are generally disposed about and/or rotate about an engine centerline 48. In other embodiments, there may be, for example, an intermediate pressure spool having an intermediate pressure turbine.

In the depicted embodiment, engine 20 core flow is discharged through nozzle 42A, and the bypass flow is discharged through nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and compressor 32 are in fluid communication with fan 28. Nozzle 42B is in fluid communication with bypass duct 30. Diffuser 34 is in fluid communication with compressor 32. Combustor 36 is fluidly disposed between compressor 32 and turbine 38. Turbine 40 is fluidly disposed between turbine 38 and nozzle 42A. In one form, combustor 36 includes a combustion liner 50 that contains a continuous combustion process. In other embodiments, combustor 36 may take other forms, and may be, for example, a wave rotor combustion system, a rotary valve combustion system, a pulse detonation combustion system or a slinger combustion system, and may employ deflagration and/or detonation combustion processes.

Fan system 28 includes a fan rotor system 48 driven by LP spool 26. In various embodiments, fan rotor system 48 includes one or more rotors (not shown) that are powered by turbine 40. Fan 28 may include one or more vanes (not shown). Bypass duct 30 is operative to transmit a bypass flow generated by fan 28 around the core of engine 20. Compressor 32 includes a compressor rotor system 50. In various embodiments, compressor rotor system 50 includes one or more rotors (not shown) that are powered by turbine 38. Turbine 38 includes a turbine rotor system 52. In various embodiments, turbine rotor system 52 includes one or more rotors (not shown) operative to drive compressor rotor system 50. Turbine rotor system 52 is drivingly coupled to compressor rotor system 50 via a shafting system 54. Turbine 40 includes a turbine rotor system 56. In various embodiments, turbine rotor system 56 includes one or more rotors (not shown) operative to drive fan rotor system 48. Turbine rotor system 56 is drivingly coupled to fan rotor system 48 via a shafting system 58. In various embodiments, shafting systems 54 and 58 include a plurality of shafts that may rotate at the same or different speeds and directions. In some embodiments, only a single shaft may be employed in one or both of shafting systems 54 and 58. Turbine 40 is operative to discharge the engine 20 core flow to nozzle 42A.

During normal operation of gas turbine engine 20, air is drawn into the inlet of fan 28 and pressurized by fan rotor 48. Some of the air pressurized by fan rotor 48 is directed into compressor 32 as core flow, and some of the pressurized air is directed into bypass duct 30 as bypass flow. Compressor 32 further pressurizes the portion of the air received therein from fan 28, which is then discharged into diffuser 34. Diffuser 34 reduces the velocity of the pressurized air, and directs the diffused core airflow into combustor 36. Fuel is mixed with the pressurized air in combustor 36, which is then combusted. The hot gases exiting combustor 36 are directed into turbines 38 and 40, which extract energy in the form of mechanical shaft power to drive compressor 32 and fan 28 via respective shafting systems 54 and 58. The hot gases exiting turbine 40 are discharged through nozzle system 42A, and provide a component of the thrust output by engine 20.

Figure 2:
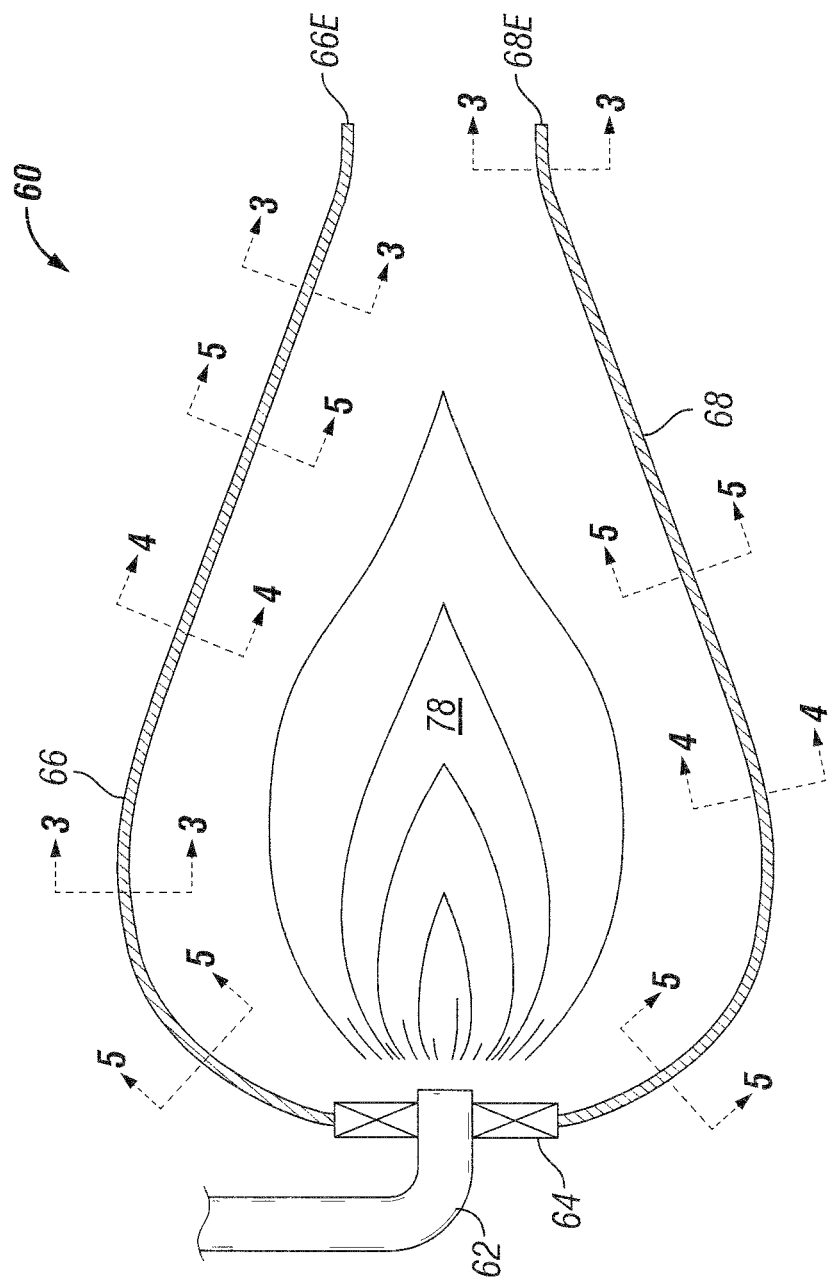
FIG. 2 schematically illustrates some aspects of a non-limiting example of a gas turbine engine combustion liner in accordance with an embodiment of the present invention.
Figure 4:
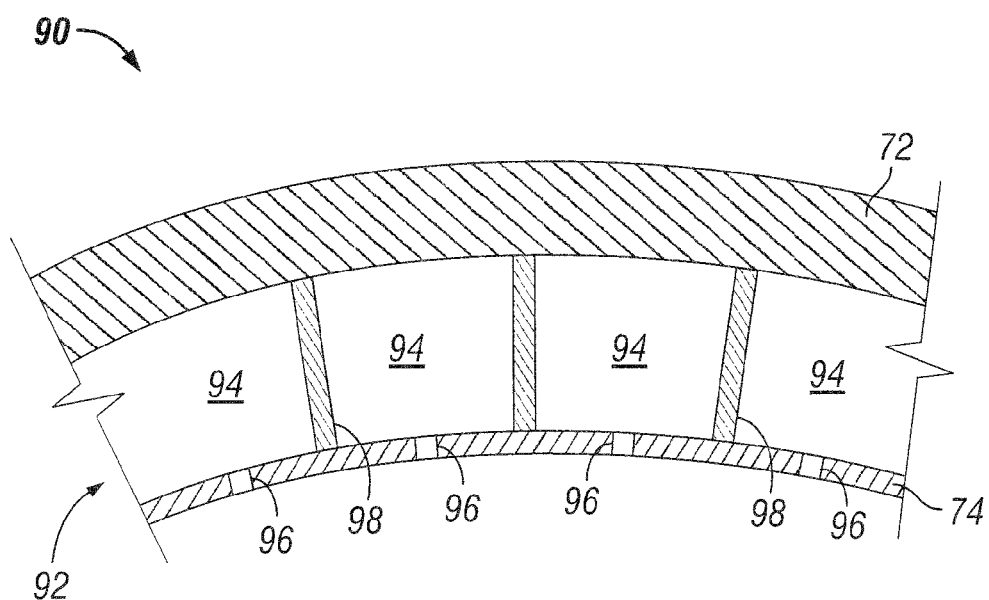
FIG. 4 schematically illustrates some aspects of a non-limiting example of another liner wall structure in accordance with an embodiment of the present invention.
Figure 5:
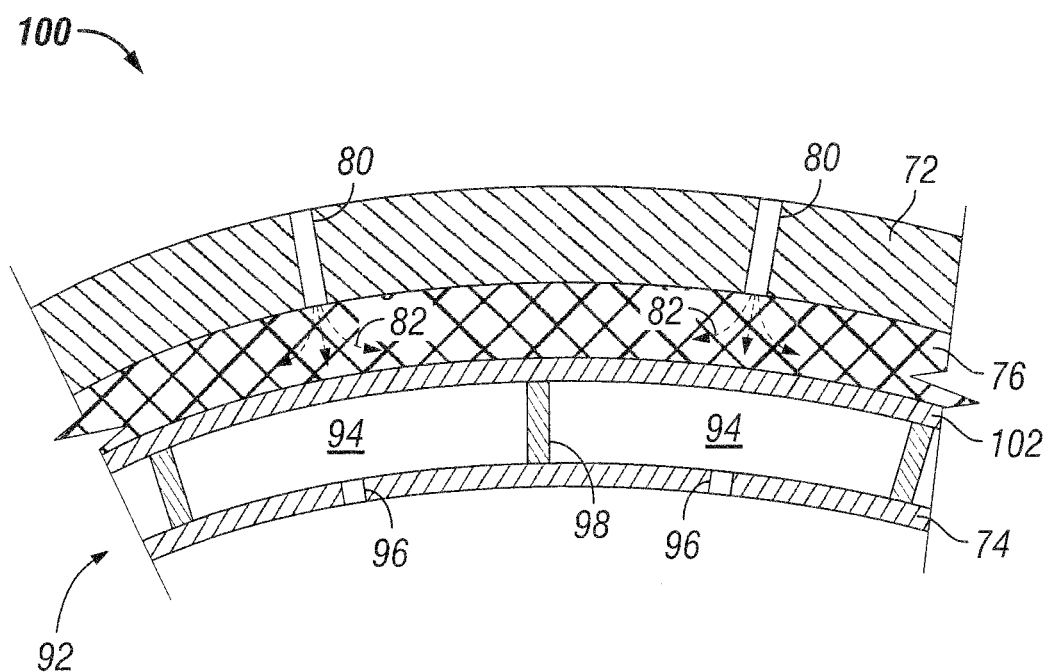
FIG. 5 schematically illustrates some aspects of a non-limiting example of yet another liner wall structure in accordance with an embodiment of the present invention.

Referring to FIG. 2, some aspects of a non-limiting example of combustion liner 60 in accordance with an embodiment of the present invention is schematically depicted. Also illustrated are a fuel injector 62 and a swirler 64 employed to create a combustion process within combustion liner 60. In one form, combustion liner 60 is an annular combustion liner, and includes an outer combustion liner 66 disposed radially around an inner combustion liner 68. Outer combustion liner 66 terminates at an aft end 66E. Inner combustion liner 68 terminates at an aft end 68E. In other embodiments, combustion liner 60 may take other forms. In various embodiments, outer combustion liner 66 and/or inner combustion liner 68 in various locations are formed of one of three types of liner wall structure: a thermally cooled wall section; an acoustically damped wall section; and a thermally cooled and acoustically damped wall section. The type of liner wall structure varies with location along outer combustion liner 66 and/or inner combustion liner 68 in accordance with the need at each location on outer combustion liner 66 and/or inner combustion liner 68 for cooling and for acoustic damping of vibrations arising from the combustion process that is contained within combustion liner 60 during the operation of engine 20. Thus, some portions of outer combustion liner 66 and inner combustion liner 68 employ a thermally cooled wall section, whereas other portions employ an acoustically damped wall section, and still other portions employ a thermally cooled and acoustically damped wall section. The type of wall section employed may vary along the length of outer combustion liner 66 and inner combustion liner 68, e.g., in an alternating or other arrangement as between two or three different types of liner wall structure. In some embodiments, only one or two of the aforementioned three types of liner wall structure may be employed, whereas in other embodiments, all three types may be employed. The location along outer combustion liner 66 and inner combustion liner 68 of a particular type of liner wall structure in various embodiments may vary with the needs of the particular application, e.g., depending upon combustion liner temperatures and acoustic characteristics. The locations of the different types of liner wall structures shown in FIG. 2 by virtue of section lines 3, 4 and 5, from which the cross-sectional schematic illustrations of FIGS. 3-5 are for illustrative purposes only, and are not intended to limit the location of such liner wall structures in any manner.

Figure 3:
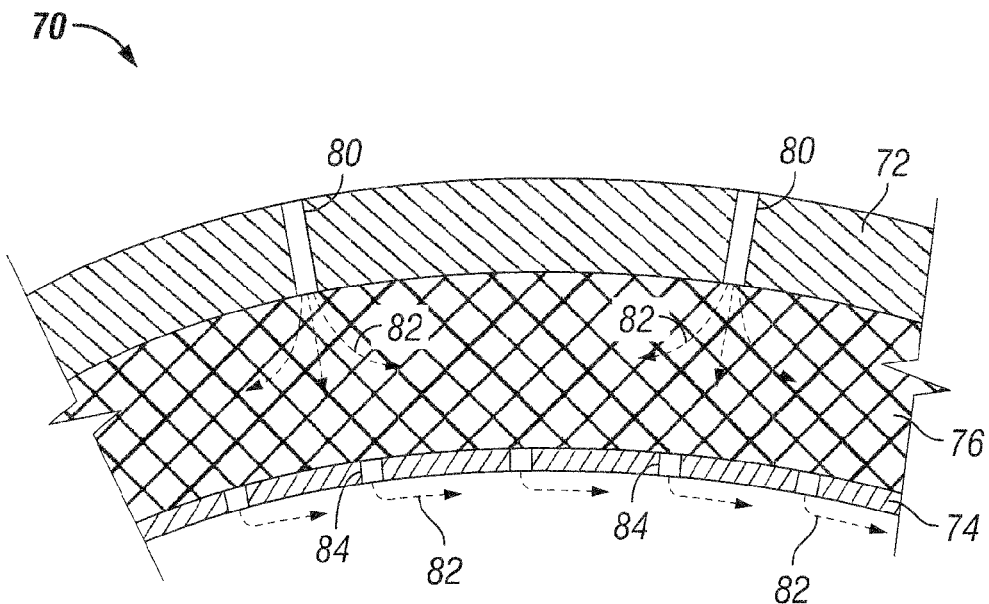
FIG. 3 schematically illustrates some aspects of a non-limiting example of a liner wall structure in accordance with an embodiment of the present invention.

Referring to FIG. 3 in conjunction with FIG. 2, some aspects of a non-limiting example of a thermally cooled wall section 70 in accordance with an embodiment of the present invention are depicted. As illustrated in FIG. 2, thermally cooled wall section 70 may be employed at one or more various locations on outer combustion liner 66 and inner combustion liner 68. Thermally cooled wall section 70 includes an outer combustion liner wall (outer wall) 72, an inner combustion liner wall (inner wall) 74, and a cellular structure in the form of a porous open cell foam 76. In various embodiments, one or more of outer wall 72, inner wall 74 and open cell foam 76 may also be common with other liner wall structures, e.g., acoustically damped wall section 90 (discussed below with respect to FIG. 4) and thermally cooled and acoustically damped wall section 100 (discussed below with respect to FIG. 5). Open cell foam 76 is disposed between outer wall 72 and inner wall 74. Outer wall 72 is exposed to diffused compressor discharge air flowing inside combustor 36, whereas inner wall 74 is exposed to the heat of combustion from the combustion process 78 taking place inside combustion liner 60 during the operation of engine 20. In one form, outer wall 72 is a structural wall configured to support the balance of the combustion liner 60, e.g., open cell foam 76 and inner wall 74 of thermally cooled wall section 70.

In one form, outer wall 72, inner wall 74 and open cell foam 76 are formed of a ceramic matrix composite. In other embodiments, one or more of outer wall 72, inner wall 74 and open cell foam 76 may be formed of one or more other composite, metallic and/or intermetallic materials or other materials. In one form, outer wall 72, inner wall 74 and open cell foam 76 are formed integrally as a unit, i.e., a unitary structure, e.g., wherein outer wall 72, inner wall 74 and open cell foam 76 are formed separately and then affixed together, e.g., via bonding or another material joining process to yield a one-piece unitary structure as the end product. In other embodiments, outer wall 72, inner wall 74 and open cell foam 76 may be formed as a unitary structure by use of a stereolithography process or another freeform or similar such manufacturing process. In still other embodiments, outer wall 72, inner wall 74 and open cell foam 76 may not be formed as a unitary structure, i.e., outer wall 72, inner wall 74 and open cell foam 76 may be assembled using mechanical fasteners, interference fits and/or other deformation schemes or the like.

In one form, outer wall 72 includes a plurality of cooling air supply openings 80 configured to receive cooling air 82 from outside of outer wall 72. In other embodiments, outer wall may not include cooling air supply openings. In still other embodiments, cooling air may be supplied via other means, e.g., from an end of outer wall 72 adjacent to swirler 64. Open cell foam 76 is configured to distribute cooling air received from cooling air supply openings 80. In one form, open cell foam 76 is configured to distribute cooling air 82 along inner wall 74 for convective cooling of inner wall 74. In other embodiments, open cell foam 76 may not be so configured. In one form, open cell foam 76 is configured to conduct heat away from inner wall 74 and transmit the heat to cooling air 82. In other embodiments, open cell foam 76 may not be so configured. In one form, in thermally cooled wall section 70, inner wall 74 includes a plurality of openings 84. In one form, openings 84 are in fluid communication with open cell foam 76. In one form, open cell foam 76 is configured to distribute cooling air 82 to openings 84. Openings 84 are configured to discharge cooling air 82, e.g., for film cooling of inner wall 74.

Referring to FIG. 4 in conjunction with FIG. 2, some aspects of a non-limiting example of an acoustically damped wall section 90 in accordance with an embodiment of the present invention are depicted. As illustrated in FIG. 2, acoustically damped wall section 90 may be employed at one or more various locations on outer combustion liner 66 and inner combustion liner 68. Acoustically damped wall section 90 includes an outer wall, e.g., outer wall 72, an inner wall, e.g., inner wall 74, and a cellular structure in the form of an honeycomb 92. In various embodiments, one or more of outer wall 72, inner wall 74 and honeycomb 92 may also be common with other liner wall structures, e.g., thermally cooled and acoustically damped wall section 100 (discussed below with respect to FIG. 5). Honeycomb 92 is disposed between outer wall 72 and inner wall 74. As with thermally cooled wall section 70, outer wall 72 is exposed to diffused compressor discharge air flowing inside combustor 36, whereas inner wall 74 is exposed to the heat of combustion from combustion process 78 taking place inside combustion liner 60 during the operation of engine 20. In one form, outer wall 72 is a structural wall configured to support the balance of the combustion liner 60, e.g., honeycomb 92 and inner wall 74 of acoustically damped wall section 90.

In one form, outer wall 72, inner wall 74 and honeycomb 92 are formed of a ceramic matrix composite. In other embodiments, one or more of outer wall 72, inner wall 74 and honeycomb 92 may be formed of one or more other composite, metallic and/or intermetallic materials. In one form, outer wall 72, inner wall 74 and honeycomb 92 are formed integrally as a unit, i.e., a unitary structure, e.g., wherein outer wall 72, inner wall 74 and honeycomb 92 may be formed separately and then affixed together, e.g., via bonding or another material joining process to yield a unitary structure as the end product. In other embodiments, outer wall 72, inner wall 74 and honeycomb 92 may be formed as a unitary structure by use of a stereolithography process or another freeform or similar such manufacturing process. In still other embodiments, outer wall 72, inner wall 74 and honeycomb 92 may not be formed as a unitary structure, i.e., outer wall 72, inner wall 74 and honeycomb 92 may be assembled using mechanical fasteners, interference fits and/or other deformation schemes or the like. In one form, outer wall 72 and inner wall 74 are continuous as between thermally cooled wall section 70 and acoustically damped wall section 90, i.e., extending continuously between sections 70 and 90. In other embodiments, outer wall 72 and inner wall 74 may be discontinuous as between thermally cooled wall section 70 and acoustically damped wall section 90. In one form, outer wall 72 and inner wall 74 have a same wall thickness in both thermally cooled wall section 70 and acoustically damped wall section 90. In other embodiments, outer wall 72 and inner wall 74 may have different thicknesses as between sections 70 and 90.

Honeycomb 92 includes a plurality of cells 94. In acoustically damped wall section 90, inner wall 74 includes a plurality of openings 96. In one form, each cell 94 is exposed to an opening 96. In other embodiments, each cell 94 may be exposed to more than one opening 96. Cells 94 and openings 96 are configured to acoustically damp vibrations at one or more selected frequencies, e.g., at frequencies associated with the geometry of combustion liner 60 and combustion process 78 and/or other parameters that yield undesirable noise emanating from engine 20 and/or are potentially damaging to one or more engine 20 components. The desired frequencies may be selected by various means, e.g., including component and/or engine testing, vibration analysis, computational fluid dynamics analysis and/or other empirical and/or analytical methods. Various parameters may be controlled in order to achieve a desired acoustic damping, including the size and volume of cells 94, the size of openings 96, the thickness of inner wall 74, as well as other parameters, e.g., the selection of material properties of one or more of outer wall 72, inner wall 74 and honeycomb 92.

In one form, the acoustical damping is effected when a high pressure wave passes through openings 96, whereby cells 94 absorb at least a portion of the high pressure wave. In some embodiments, the wave energy may be at least partially viscously damped as the wave passes through openings 96. Then, during a lull in pressure inside combustion liner 60 as the high pressure wave recedes, cells 94 release the higher pressure stored therein, adding the pressure to the trough of the receding wave. Also, in some embodiments, additional viscous damping may be achieved as the dynamic mass flow exits cells 94 via openings 96.

Referring to FIG. 5, a thermally cooled and acoustically damped wall section 100 is depicted. As illustrated in FIG. 2, thermally cooled and acoustically damped wall section 100 may be employed at one or more various locations on outer combustion liner 66 and inner combustion liner 68. Thermally cooled and acoustically damped wall section 100 includes an outer wall, e.g., outer wall 72, an inner wall, e.g., inner wall 74, a layer of a cellular structure in the form of open cell foam 76, an intermediate wall 102, and a layer of a cellular structure in the form of honeycomb 92. Open cell foam 76 and honeycomb 92 are disposed between outer wall 72 and inner wall 74. In particular, in acoustically damped wall section 100, open cell foam 76 is disposed between outer wall 72 and intermediate wall 102; and honeycomb 92 is disposed between intermediate wall 102 and inner wall 74.

As with thermally cooled wall section 70 and acoustically damped wall section 90, outer wall 72 is exposed to diffused compressor discharge air flowing inside combustor 36, whereas inner wall 74 is exposed to the heat of combustion from combustion process 78 taking place inside combustion liner 60 during the operation of engine 20. In one form, outer wall 72 is a structural wall configured to support the balance of the combustion liner 60, e.g., open cell foam 76, intermediate wall 102, honeycomb 92 and inner wall 74 of thermally cooled and acoustically damped wall section 100.

In one form, outer wall 72, open cell foam 76, intermediate wall 102, honeycomb 92 and inner wall 74 are formed of a ceramic matrix composite. In other embodiments, one or more of outer wall 72, open cell foam 76, intermediate wall 102, honeycomb 92 and inner wall 74 may be formed of one or more other composite, metallic and/or intermetallic materials. In one form, outer wall 72, open cell foam 76, intermediate wall 102, honeycomb 92 and inner wall 74 are formed integrally as a unit, i.e., a unitary structure, e.g., wherein outer wall 72, open cell foam 76, intermediate wall 102, honeycomb 92 and inner wall 74 are formed separately and then affixed together, e.g., via bonding or another material joining process to yield a unitary structure as the end product. In other embodiments, outer wall 72, open cell foam 76, intermediate wall 102, honeycomb 92 and inner wall 74 may be formed integrally as a unitary structure by use of a stereolithography process or another freeform or similar such manufacturing process. In still other embodiments, outer wall 72, open cell foam 76, intermediate wall 102, honeycomb 92 and inner wall 74 may not be formed as a unitary structure, i.e., outer wall 72, open cell foam 76, intermediate wall 102, honeycomb 92 and inner wall 74 may be assembled using mechanical fasteners, interference fits and/or other deformation schemes or the like.

In one form, outer wall 72 and inner wall 74 are continuous as between thermally cooled wall section 70, acoustically damped wall section 90 and thermally cooled and acoustically damped wall section 100, i.e., extending continuously between sections 70, 90 and 100. In other embodiments, outer wall 72 and inner wall 74 may be discontinuous as between thermally cooled wall section 70, acoustically damped wall section 90 and thermally cooled and acoustically damped wall section 100. In one form, outer wall 72 and inner wall 74 have a same wall thickness in thermally cooled wall section 70, acoustically damped wall section 90 and thermally cooled and acoustically damped wall section 100. In other embodiments, outer wall 72 and inner wall 74 may have different thicknesses as between sections 70, 90 and 100.

In one form, in thermally cooled and acoustically damped wall section 100, outer wall 72 includes a plurality of cooling air supply openings 80 configured to receive cooling air 82 from outside of outer wall 72. In other embodiments, outer wall 72 may not include cooling air supply openings 80. The size of openings 80 may vary with location in thermally cooled and acoustically damped wall section 100, and may vary as with respect to the size of openings 80 in thermally cooled wall section 70. In still other embodiments, cooling air 82 may be supplied via other means, e.g., from an end of outer wall 72 adjacent to swirler 64. As with thermally cooled wall section 70, open cell foam 76 is configured to distribute cooling air received from cooling air supply openings 80. In one form, open cell foam 76 is configured to distribute cooling air 82 along intermediate wall 102 for convective cooling of intermediate wall 102. In other embodiments, open cell foam 76 may not be so configured. In one form, open cell foam 76 is configured to conduct heat away from intermediate wall 102 and transmit the heat to cooling air 82. In other embodiments, open cell foam 76 may not be so configured. Cooling air 82 may be discharged from open cell foam 76 at one or more locations, e.g., openings (not shown) in intermediate wall 102 and/or openings (not shown) in ends 66E and 68E.

As with acoustically damped wall section 90, honeycomb 92 includes a plurality of cells 94, and inner wall 74 includes a plurality of openings 96. Cells 94 are defined by walls 98. In one form, each cell 94 is exposed to an opening 96. In other embodiments, each cell 94 may be exposed to more than one opening 96. Cells 94 and openings 96 are configured to acoustically damp vibrations at one or more selected frequencies, e.g., at frequencies associated with the geometry of combustion liner 60 and combustion process 78 and/or other parameters that yield undesirable noise emanating from engine 20 and/or are potentially damaging to one or more engine 20 components. Various parameters may be controlled in order to achieve a desired acoustic damping, including the size, shape and volume of cells 94, the size of openings 96, the thickness of inner wall 74, as well as other parameters, e.g., the selection of material properties of one or more of outer wall 72, open cell foam 76, intermediate wall 102, honeycomb 92 and inner wall 74. The size volume of cells 94, and the size and shape of openings 96 in thermally cooled and acoustically damped wall section 100 may vary as with respect to cells 94 and openings 96 in acoustically damped wall section 90. The acoustical damping may be obtained in thermally cooled and acoustically damped wall section 100 in the same manner as acoustically damped wall section 90.

Embodiments of the present invention include a combustion liner, comprising: an outer combustion liner wall; an inner combustion liner wall; and a cellular structure disposed between the outer combustion liner wall and the inner combustion liner wall, wherein at least one of the outer combustion liner wall and the inner combustion liner wall includes a plurality of openings extending therethrough.

In a refinement, the cellular structure is formed of a composite material.

In another refinement, the composite material is a ceramic matrix composite.

In yet another refinement, the outer combustion liner wall, the inner combustion liner wall and the cellular structure are formed of one or more composite materials.

In still another refinement, the one or more composite materials includes a ceramic matrix composite.

In yet still another refinement, the outer combustion liner wall, the inner combustion liner wall and the cellular structure are formed as a unitary structure.

In a further refinement, the inner combustion liner wall includes the plurality of openings; wherein the cellular structure is a honeycomb formed of a plurality of cells exposed to the plurality of openings; and wherein the plurality of cells and the plurality of openings are configured to acoustically damp vibrations at one or more selected frequencies.

In a yet further refinement, the outer combustion liner wall includes the plurality of openings in the form of cooling air supply openings; and wherein the cellular structure is an open cell foam configured to distribute cooling air received from the cooling air supply openings.

In a still further refinement, the inner combustion liner wall includes an other plurality of openings configured to discharge cooling air received from the open cell foam.

In a yet still further refinement, the cellular structure varies in nature as between different locations about the combustion liner; wherein the cellular structure is in the form of an open cell foam configured to distribute cooling air at one or more locations on the combustion liner; and wherein the cellular structure forms at least part of an acoustic damper configured to acoustically damp vibrations at one or more selected frequencies at another one or more locations on the combustion liner.

In an additional refinement, the acoustic damper includes the cellular structure in the form of a honeycomb.

In another additional refinement, the cellular structure includes a layer of open cell foam and a layer of the at least part of the acoustic damper at a same location of the combustion liner.

In yet another additional refinement, the combustion liner further comprises an intermediate wall disposed between the honeycomb and the open cell foam.

Embodiments of the present invention include a combustion liner, comprising: an outer combustion liner wall having a cooling air supply opening therein; a porous open cell foam positioned disposed in fluid communication with the cooling air supply opening; and an inner combustion liner wall, wherein the open cell foam is configured to distribute cooling air received from the cooling air supply openings.

In a refinement, the inner combustion liner wall includes a plurality of openings configured to discharge cooling air received from the open cell foam.

In another refinement, the inner combustion liner wall includes a plurality of openings; further comprising a honeycomb disposed between the inner combustion liner wall and the outer combustion liner wall; wherein the honeycomb includes a plurality of cells in fluid communication with the plurality of openings; wherein the plurality of cells and the plurality of openings are configured to acoustically damp vibrations at one or more selected frequencies in the combustion liner.

In yet another refinement, the combustion liner further comprises an intermediate wall disposed between the open cell foam and the honeycomb.

In still another refinement, the outer combustion liner wall, the open cell foam, the honeycomb and the inner combustion liner wall are formed integrally as a unit.

In yet still another refinement, the outer combustion liner wall, the open cell foam and the inner combustion liner wall are formed integrally as a unit.

In a further refinement, the outer combustion liner wall is a structural wall configured to support the balance of the combustion liner.

Embodiments of the present invention include a gas turbine engine, comprising: a compressor; a combustor in fluid communication with the compressor; and a turbine in fluid communication with the combustor, wherein the combustor includes a combustion liner includes an outer combustion liner wall; an inner combustion liner wall; means for cooling the combustion liner disposed between the outer combustion liner wall and the inner combustion liner wall; and means for acoustically damping vibrations disposed between the outer combustion liner wall and the inner combustion liner wall.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A combustion liner, comprising:
   an outer combustion liner wall;
   an inner combustion liner wall;
   an open cell foam disposed between the outer combustion liner wall and the inner combustion liner wall, wherein at least one of the outer combustion liner wall and the inner combustion liner wall includes a plurality of openings extending therethrough; and
   a plurality of cells exposed to the plurality of openings;
   wherein the open cell foam is formed of a composite material, wherein the composite material of the open cell foam is a ceramic matrix composite.

2. The combustion liner of claim 1, wherein the outer combustion liner wall, the inner combustion liner wall and the open cell foam are formed of one or more composite materials.

3. The combustion liner of claim 2, wherein the one or more composite materials includes a ceramic matrix composite.

4. The combustion liner of claim 1, wherein the outer combustion liner wall, the inner combustion liner wall and the open cell foam are formed as a unitary structure.

5. The combustion liner of claim 1, wherein the inner combustion liner wall includes the plurality of openings; wherein the plurality of cells forms a honeycomb; and wherein the plurality of cells and the plurality of openings are configured to acoustically damp vibrations at one or more selected frequencies.

6. The combustion liner of claim 1, wherein the outer combustion liner wall includes the plurality of openings in the form of cooling air supply openings; and wherein the open cell foam is configured to distribute cooling air received from the cooling air supply openings.

7. The combustion liner of claim 6, wherein the inner combustion liner wall includes another plurality of openings configured to discharge cooling air received from the open cell foam.

8. The combustion liner of claim 1, wherein the open cell foam varies in nature as between different locations about the combustion liner; wherein the open cell foam is configured to distribute cooling air at one or more locations on the combustion liner; and further comprising a honeycomb formed by the plurality of cells configured to form at least part of an acoustic damper configured to acoustically damp vibrations at one or more selected frequencies at another one or more locations on the combustion liner.

9. The combustion liner of claim 8, wherein the combustion liner includes a layer of the open cell foam and a layer of the at least part of the acoustic damper at a same location of the combustion liner.

10. The combustion liner of claim 8, further comprising an intermediate wall disposed between the honeycomb and the open cell foam.

11. A combustion liner, comprising:
    an outer combustion liner wall having a cooling air supply opening therein;
    a porous open cell foam disposed in fluid communication with the cooling air supply opening; and
    an inner combustion liner wall,
    wherein the open cell foam is configured to distribute cooling air received from the cooling air supply opening;
    wherein the inner combustion liner wall includes a plurality of openings; further comprising a honeycomb disposed between the inner combustion liner wall and the outer combustion liner wall; wherein the honeycomb includes a plurality of cells in fluid communication with the plurality of openings; wherein the plurality of cells and the plurality of openings are configured to acoustically damp vibrations at one or more selected frequencies in the combustion liner;
    wherein the open cell foam includes a ceramic matrix composite.

12. The combustion liner of claim 11, wherein the inner combustion liner wall includes a plurality of openings configured to discharge cooling air received from the open cell foam.

13. The combustion liner of claim 11, further comprising an intermediate wall disposed between the open cell foam and the honeycomb.

14. The combustion liner of claim 11, wherein the outer combustion liner wall, the open cell foam, the honeycomb and the inner combustion liner wall are formed integrally as a unit.

15. The combustion liner of claim 11, wherein the outer combustion liner wall, the open cell foam and the inner combustion liner wall are formed integrally as a unit.

16. The combustion liner of claim 11, wherein the outer combustion liner wall is a structural wall configured to support the balance of the combustion liner.

17. A gas turbine engine, comprising:
a compressor;
a combustor in fluid communication with the compressor; and
a turbine in fluid communication with the compressor; and
wherein the combustor includes a combustion liner having an outer combustion liner wall; and inner combustion liner wall; and an open cell foam including a ceramic matrix composite for cooling the combustion liner disposed between the outer combustion liner wall and the inner combustion liner wall; and means for acoustically damping vibrations disposed between the outer combustion liner wall and the inner combustion liner wall.

18. A combustion liner, comprising:
an acoustically damped wall section and a thermally cooled wall section;
wherein the acoustically damped wall section includes:
 an outer combustion liner wall;
 an inner combustion liner wall; and
 a honeycomb disposed between the outer combustion liner wall and the inner combustion liner wall, wherein at least one of the outer combustion liner wall and the inner combustion liner wall includes a plurality of openings extending therethrough,
 wherein the honeycomb includes a plurality of cells in fluid communication with the plurality of openings; and wherein the plurality of cells and the plurality of openings are configured to acoustically damp vibrations at one or more selected frequencies in the combustion liner;
 wherein the honeycomb is formed of a composite material, wherein the composite material is a ceramic matrix composite; and
the thermally cooled wall section includes an open cell foam disposed between the outer combustion liner wall and the inner combustion liner wall;
wherein the acoustically damped wall section and the thermally cooled wall section vary with location along the outer combustion liner wall and/or the inner combustion liner wall.

19. The combustion liner of claim 18, wherein the outer combustion liner wall, the inner combustion liner wall and the honeycomb are formed of one or more composite materials.

20. The combustion liner of claim 19, wherein the one or more composite materials includes a ceramic matrix composite.

21. The combustion liner of claim 18, wherein the outer combustion liner wall, the inner combustion liner wall and the honeycomb are formed as a unitary structure.

* * * * *